(12) United States Patent  
Eldor

(10) Patent No.: US 9,718,623 B2  
(45) Date of Patent: Aug. 1, 2017

(54) CONVEYOR TRACK LUBRICATOR SYSTEM

(71) Applicant: TARPAULIN.COM, INC., Woodbury, NY (US)

(72) Inventor: Niv Eldor, South Setauket, NY (US)

(73) Assignee: TARPAULIN.COM, INC., Woodbury, NY (US)

( * ) Notice: Subject to any disclaimer, the term of this patent is extended or adjusted under 35 U.S.C. 154(b) by 0 days.

(21) Appl. No.: 15/279,747

(22) Filed: Sep. 29, 2016

(65) Prior Publication Data

US 2017/0088363 A1    Mar. 30, 2017

Related U.S. Application Data

(60) Provisional application No. 62/235,063, filed on Sep. 30, 2015.

(51) Int. Cl.
*B65G 45/02* (2006.01)
*B65G 45/22* (2006.01)

(52) U.S. Cl.
CPC ............ *B65G 45/02* (2013.01); *B65G 45/22* (2013.01)

(58) Field of Classification Search
CPC ......... B65G 45/02; B65G 45/08; B65G 45/22
USPC ........................................................ 198/500
See application file for complete search history.

(56) References Cited

U.S. PATENT DOCUMENTS

| | | | |
|---|---|---|---|
| 3,869,023 A * | 3/1975 | Thomson | B65G 45/08 184/15.2 |
| 4,085,821 A * | 4/1978 | Kast | F16N 27/00 184/15.2 |
| 5,186,280 A * | 2/1993 | Mattcheck | F16N 29/02 184/15.3 |
| 6,102,161 A * | 8/2000 | Gomez Diaz | B65G 45/02 184/15.3 |
| 6,394,261 B1 | 5/2002 | DeGennaro | |
| 6,523,677 B1 | 2/2003 | DeGennaro et al. | |
| 6,755,295 B2 * | 6/2004 | Weskamp | B65G 45/08 184/15.1 |
| 7,044,287 B1 | 5/2006 | Gray | |
| 7,210,569 B1 | 5/2007 | Tarhan et al. | |
| 7,946,415 B2 | 5/2011 | DeGennaro, Jr. | |
| 8,161,901 B1 | 4/2012 | DeGennaro et al. | |
| 8,197,117 B2 | 6/2012 | White | |
| 8,770,393 B1 | 7/2014 | DeGennaro, Jr. | |
| 8,926,463 B1 | 1/2015 | Eldor | |
| 9,032,976 B2 | 5/2015 | Berntsen et al. | |
| 2016/0304285 A1 | 10/2016 | Eldor et al. | |

\* cited by examiner

*Primary Examiner* — Gerald McClain  
*Assistant Examiner* — Keith R Campbell  
(74) *Attorney, Agent, or Firm* — Hoffmann & Baron, LLP

(57) ABSTRACT

A track lubricator device for a conveyor belt system includes an applicator bracket configured for mounting to a conveyor belt supporting track of the conveyor belt system, an applicator pad supported on the applicator bracket and a source of lubricating fluid in communication with the applicator pad, wherein the pad is configured for applying a lubricating fluid to a bottom surface of a conveyor belt as the conveyor belt travels along the conveyor belt supporting track.

16 Claims, 6 Drawing Sheets

CONVEYOR TRACK LUBRICATOR SYSTEM

CROSS-REFERENCE TO RELATED APPLICATIONS

This application claims the benefit of U.S. Provisional Application Ser. No. 62/235,063 filed Sep. 30, 2015, the disclosure of which is hereby incorporated by reference in its entirety.

BACKGROUND OF THE INVENTION

The present invention relates to drive mechanisms for conveyor belt systems and, more particularly, to a lubricator device for applying a lubricating oil on the conveyor belt used in a conveyor belt system.

Conveyor belt systems are well-known in the art. They are commonly used in applications where it is desired to keep an item moving for an extended period of time within a contained environment, e.g., a product traveling through a processing zone for cooling, heating or any other process applied to the product. As will be recognized by those skilled in the art, a conveyor belt system typically consists of an endless conveyor belt traveling along a path defined by a plurality of tracks or rails. The conveyor belt is supported by the tracks and the product is supported on the conveyor belt whereby the product travels along with the belt on top of the tracks.

Spiral systems are one type of conveyor belt system wherein the conveyor belt travels through concentric stacked helical paths whereby an item travels upward in elevation along the helical paths and/or downward in elevation along the helical paths. These systems typically utilize a cage (sometimes known as a "drum") for driving the conveyor belt. More particularly, the cage is centrally positioned within the helical path, and may include a plurality of circumferentially-spaced vertical driving bars which contact the inner edge of the belt to impart a driving force thereto. As the cage rotates, the conveyor belt is pulled along its helical path.

In many spiral systems, the cage extends from and is supported by a centrally-located shaft. In turn, the shaft is rotatably supported upon a stationary frame. A drive mechanism is connected to the cage, and rotates the cage with respect to the frame. As the drive mechanism turns the cage, the cage contacts/drives the belt through the helical pathway of the conveyor belt system. Smaller cages often times utilize a center drive mechanism which directly communicates with the center shaft, resulting in rotation of the cage. Larger cages typically utilize a chain and tooth arrangement whereby the chain extends around the circumference of the cage and engages teeth located on the circumference of such cage. The chain in turn communicates with a drive motor.

In spiral conveyor systems, the belt runs continuously from a discharge region of the cage to an infeed region to repeat the spiral conveying. The path between the discharge region and the infeed region of the cage is called "the return path." In the return path, the conveyor belt runs in the opposite direction to the belt supported on the spiral path of the cage. Moreover, in all cases when the infeed is not aligned with the discharge, the belt must be traversed along a curved return path.

In all conveyor systems, (spiral or otherwise), the friction between the belt and the track support system is an extremely important consideration. As the friction decreases, the performance of the system improves. As is generally known, friction between two surfaces is a factor of the finish and the material that the two surfaces are made from. Every material and surface has a Coefficient of Frication (COF) that is a measure by a number from 0.0 to 0.5. Traditionally, the tracks of typical conveyor systems are covered with ultra-high-molecular-weight polyethylene (UHMW) strips, called "wear strips," that have a Coefficient of Friction of 0.22.

In many cases, this Coefficient of Friction increases due to debris and dirt accumulation on the tracks. When this COF increases, the performance of the system degrades. Accordingly, most conveyor systems utilize some type of lubricator device to add oil to the track to reduce the COF as much as possible.

A typical device for adding oil to the tracks applies a thin film of oil directly to the bottom of the belt and the belt carries the oil to the tracks. The application of the oil is done by a set of brushes at the point where the belt is up-side-down and accessible.

However, with such prior art lubricating devices, the oil is fed by gravity and, therefore, the amount of oil applied is not accurate. This challenge of applying oil is even greater in spiral systems, since the oil is applied to the belt at a location at the bottom of the spiral. In this case, a large amount of oil is necessary to make sure the tracks are lubricated along the entire length of the spiral. As a result, excess oil frequently drips on the floor and accumulates on the lower tracks potentially contaminating the product on the belt.

Accordingly, there is a need in the art for a simple lubricating device to provide an accurate amount of oil to the conveyor belt/track interface of a conveyor system. It would also be desirable for the device to be clean and non-contaminating to the products being conveyed on the system.

SUMMARY OF THE INVENTION

The track lubricator device according to the present invention generally includes an applicator bracket configured for mounting to a conveyor belt supporting track of the conveyor belt system, an applicator pad supported on the applicator bracket and a source of lubricating fluid in communication with the applicator pad, wherein the pad is configured for applying a lubricating fluid to a bottom surface of a conveyor belt as the conveyor belt travels along the conveyor belt supporting track.

In a preferred embodiment, the applicator pad is in the form of a capillary plate having a plurality of through-holes extending between a top surface and a bottom surface of the capillary plate. The applicator bracket preferably includes an internal fluid chamber communicating with the bottom surface of the capillary plate, wherein the internal fluid chamber receives the lubricating fluid from the source of lubricating fluid. The device further preferably includes a pump for pumping the lubricating fluid from the source of lubricating fluid to the applicator pad.

The applicator bracket preferably includes a head portion configured for positioning a top surface of the applicator pad in-line and co-planar with a top surface of the conveyor belt supporting track. The applicator bracket may further include at least one transition ramp portion having an inclined surface rising in a direction away from the head portion, wherein the transition ramp portion is configured for mounting a wear strip of the conveyor belt supporting track thereto.

According to another aspect of the present invention, a conveyor belt system is provided. The conveyor belt system generally includes a supporting structure, at least one track supported on the supporting structure, an endless conveyor belt movably supported on the at least one track, a drive mechanism for moving the conveyor belt along a path defined by the track and a lubricating device mounted on the track for applying a lubricating fluid to a bottom surface of the conveyor belt against the direction of gravity as the conveyor belt travels along the track.

In a method for lubricating an interface between a moving conveyor belt and a track supporting the moving conveyor belt of a conveyor belt system, according to the present invention, a lubricating device is provided on the track and a lubricating fluid is applied to a bottom surface of the conveyor belt with the lubricating device as the conveyor belt travels along the track, wherein the lubricating fluid is applied to the bottom surface of the conveyor belt in a direction against the direction of gravity and is applied at a location in-line and co-planar with a top surface of the track.

The present invention further provides a method of installing a lubricating device on a conveyor belt system having a track defining a conveyor belt path and an endless conveyor belt movably supported on the track. The method includes mounting a lubricating device on the track for applying a lubricating fluid to a bottom surface of the conveyor belt against the direction of gravity as the conveyor belt travels along the track. The mounting of the lubricating device involves removing a portion of the track to form a gap in the track and installing an applicator pad of the lubricating device in the gap of the track, whereby the applicator pad is in-line and co-planar with a top surface of the track.

Features of the disclosure will become apparent from the following detailed description considered in conjunction with the accompanying drawings. It is to be understood, however, that the drawings are designed as an illustration only and not as a definition of the limits of this disclosure.

DETAILED DESCRIPTION OF THE INVENTION

Figure 1:
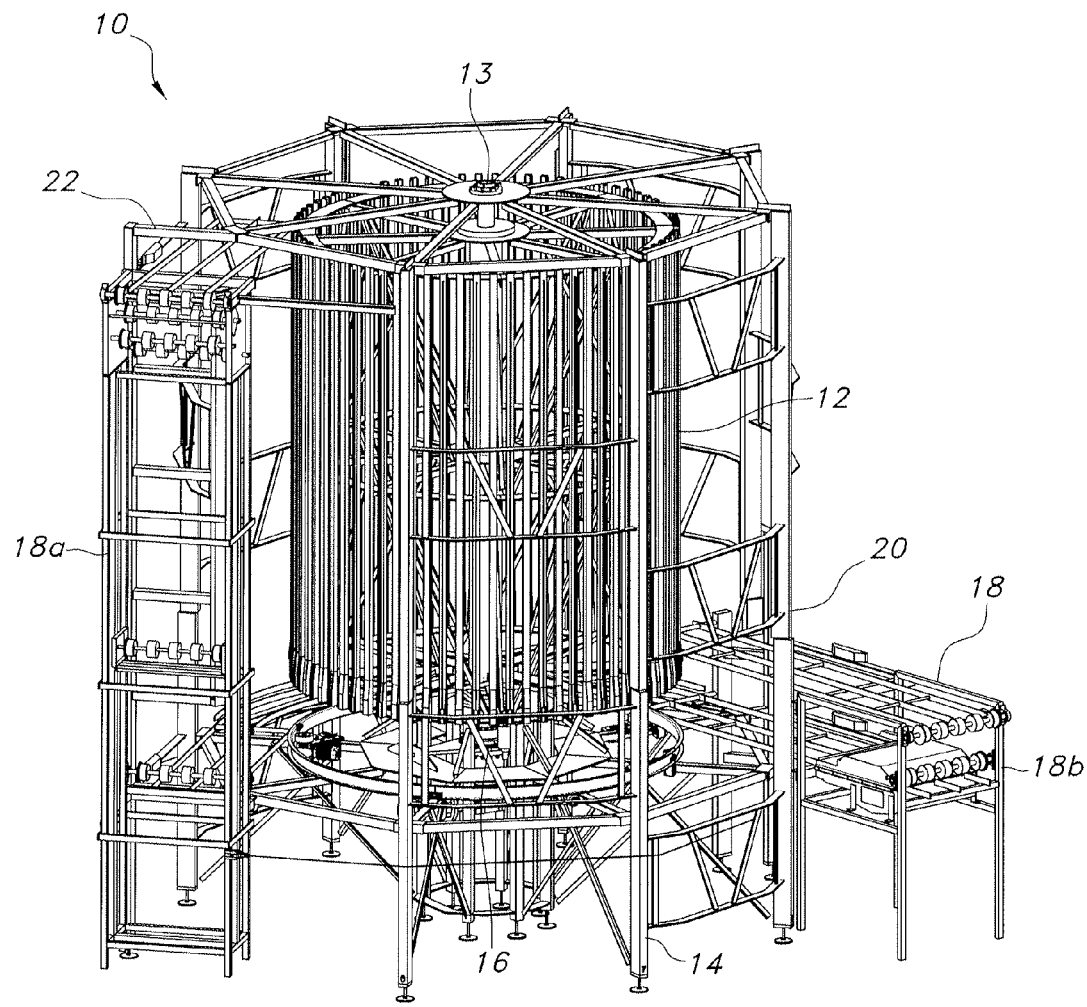
FIG. 1 is a perspective view of a conventional spiral conveyor belt system according to the prior art.
Figure 2:
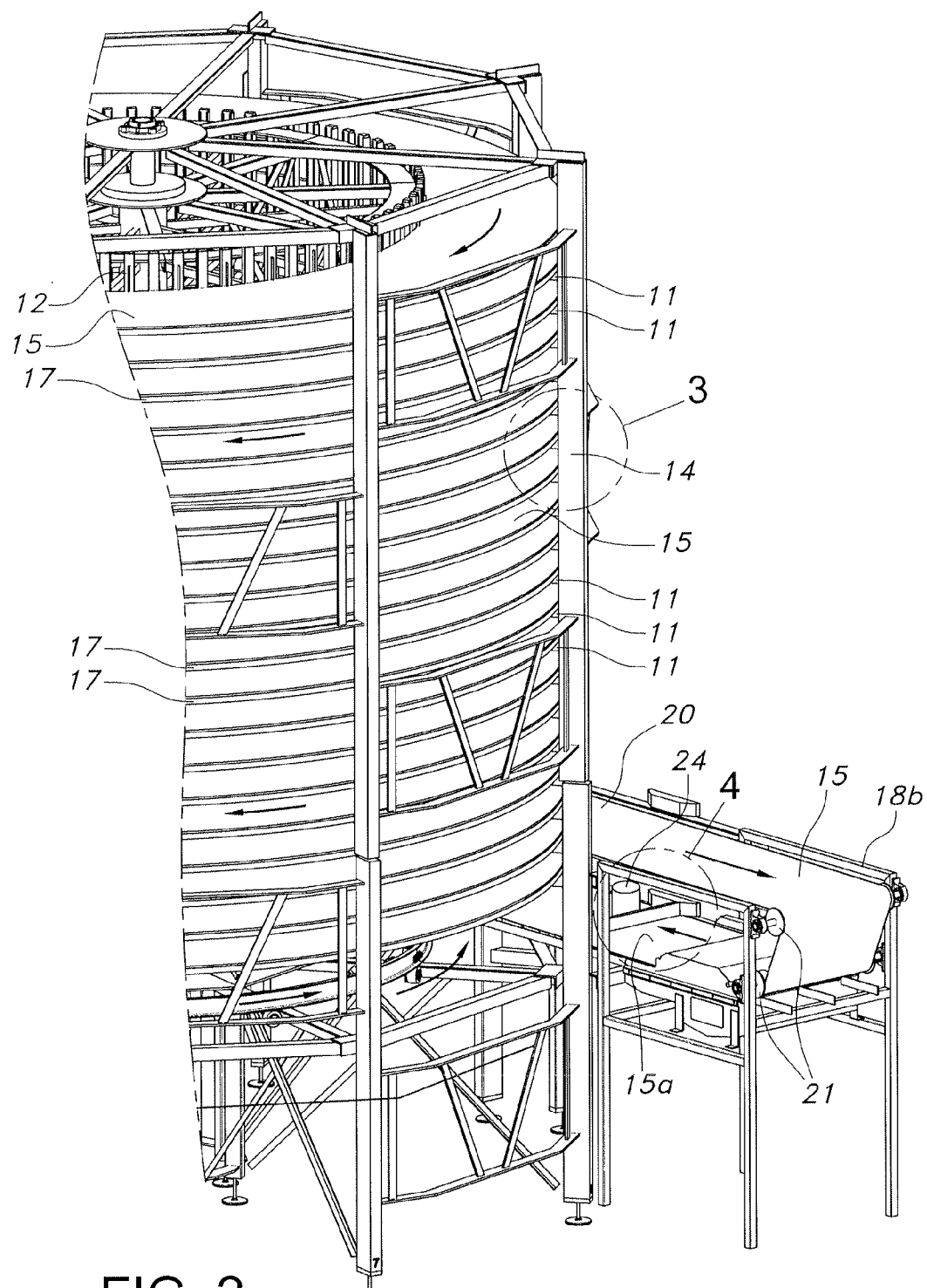
FIG. 2 is an isolated detail view of the conventional spiral conveyor belt system shown in FIG. 1, further showing the conveyor belt and the conveyor belt support structure.

FIGS. 1 and 2 show a prior art spiral conveyor belt system 10. However, the present invention is not limited to spiral conveyor systems. It is anticipated that the lubricator device of the present invention can be utilized in all conveyor belt systems in which a moving conveyor belt is supported, at least in places, by a stationary track or rail structure.

As shown in FIGS. 1 and 2, the known spiral conveyor belt system 10 generally includes a rotating cage 12 supported on a rotatable central shaft 13 of a stationary frame 14. A motor 16 drives the shaft 13 for rotating the cage 12, which in turn drives a conveyor belt 15 along a helical path, as shown in FIG. 2. In the embodiment shown in the drawings, the motor 16 is centrally located within the frame 14 to directly drive the shaft 13. However, a roller chain, which extends around the outer circumference of the cage 12, may be utilized to turn the cage 12 when driven by a motor.

Figure 3:
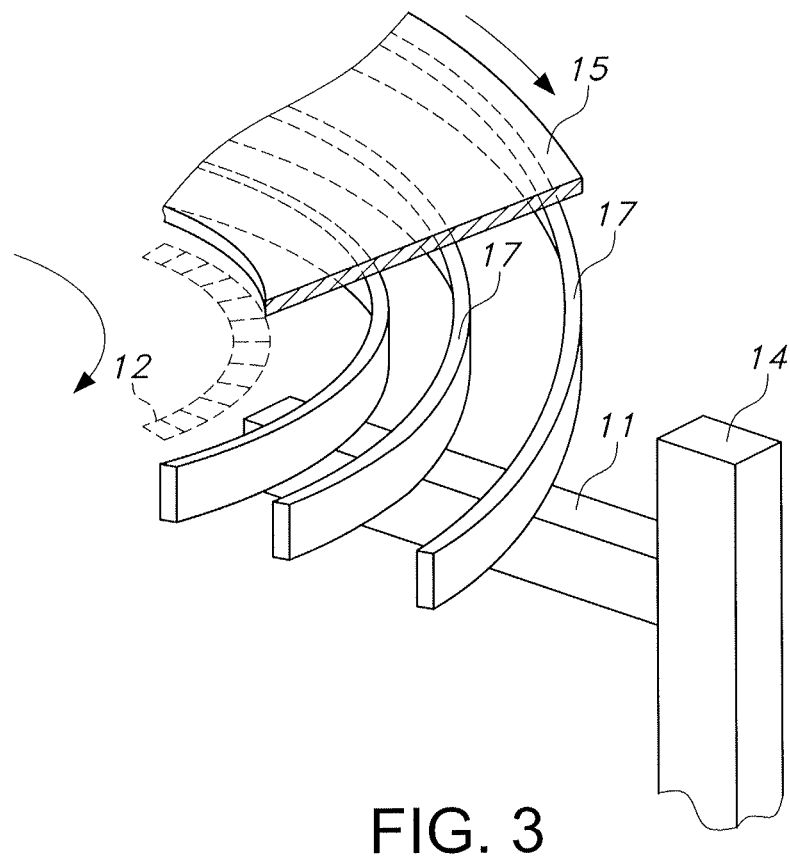
FIG. 3 is a further enlarged isolated detail view of the conventional spiral conveyor belt system shown in FIG. 1, further showing the conveyor belt and the conveyor belt support structure.

As shown in FIGS. 2 and 3, the stationary frame 14 includes a plurality of horizontal supports 11 extending radially inwardly from spaced locations along the periphery of the frame 14. The horizontal supports 11 support at least two tracks or rails 17, which, in turn provide support for the moving conveyor belt 15. The tracks 17 extend generally parallel to each other and are spaced apart from one another in a lateral direction so that the tracks support the entire width of the conveyor belt 15. The number of tracks 17 is chosen depending on the overall width of the belt 15.

The tracks 17, in the case of a spiral conveyor belt system, are curved and continuously extend around the rotating cage 12. Thus, the horizontal supports 11, together with the tracks 17, define a helical path around the cage 12. As the cage 12 rotates, the conveyor belt 15, whose inner radial edge is frictionally engaged with the cage, is pulled along this helical path on top of the tracks 17.

Returning to FIGS. 1 and 2, the system 10 further preferably includes a conveyor belt return assembly 18 for guiding the conveyor belt 15 from a discharge region 20 of the cage 12 to an infeed region 22 of the cage. The conveyor belt return assembly 18 preferably includes an arrangement of rollers 21 and guides for supporting the conveyor belt 15 along its return path from the discharge region 20 to the in feed region 22.

Thus, the system 10 shown in FIGS. 1 and 2 includes a cage 12 rotating clockwise and having a discharge region 20 at the lower right of FIGS. 1 and 2 and an in-feed region 22 at the upper left of the drawing. However, the direction of the travel of the belt 15 can be reversed from that shown in FIGS. 1 and 2, wherein the discharge region for the belt 15 would be located at the upper part of the cage, and the in feed region would be located at the lower part of the cage. In this embodiment, the cage 12 shown in FIGS. 1 and 2 would rotate counter-clockwise.

As mentioned above, in order to reduce the amount of friction between the moving conveyor belt 15 and the stationary tracks 17, a lubricator device 24 is typically provided. In prior art spiral conveyor belt systems 10, the lubricator device 24 is typically located at a point where the conveyor belt 15 reverses direction so that a lubricating oil can be applied to the bottom surface 15a of the belt 15.

Figure 4:
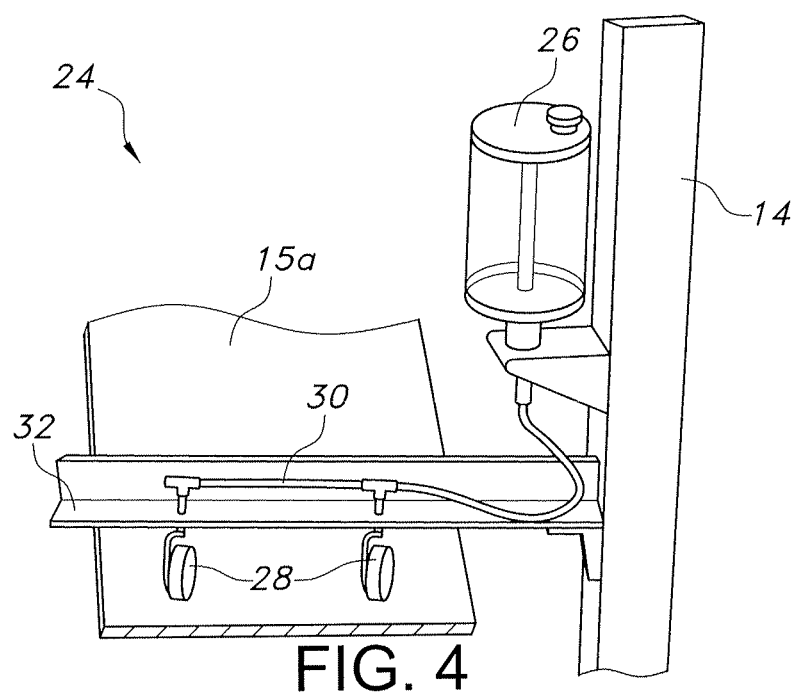
FIG. 4 is an isolated detail view of the prior art lubricator device shown in FIG. 2.

As shown in further detail in FIG. 4, a typical lubricator device 24 includes an oil reservoir 26 supported on the frame 14 for supplying a lubricating oil to one or more brushes 28 via tubing 30. The brushes 28 are typically supported on a cross-bar 32 spanning the width of the underside 15a of the conveyor belt. The oil is fed by gravity from the reservoir 26 to the brushes 28 for applying a thin film of oil directly to the bottom 15a of the belt and the belt carries the oil to the tracks. As discussed above, such prior art lubricating devices have many drawbacks, which the present invention eliminates.

Figure 5:
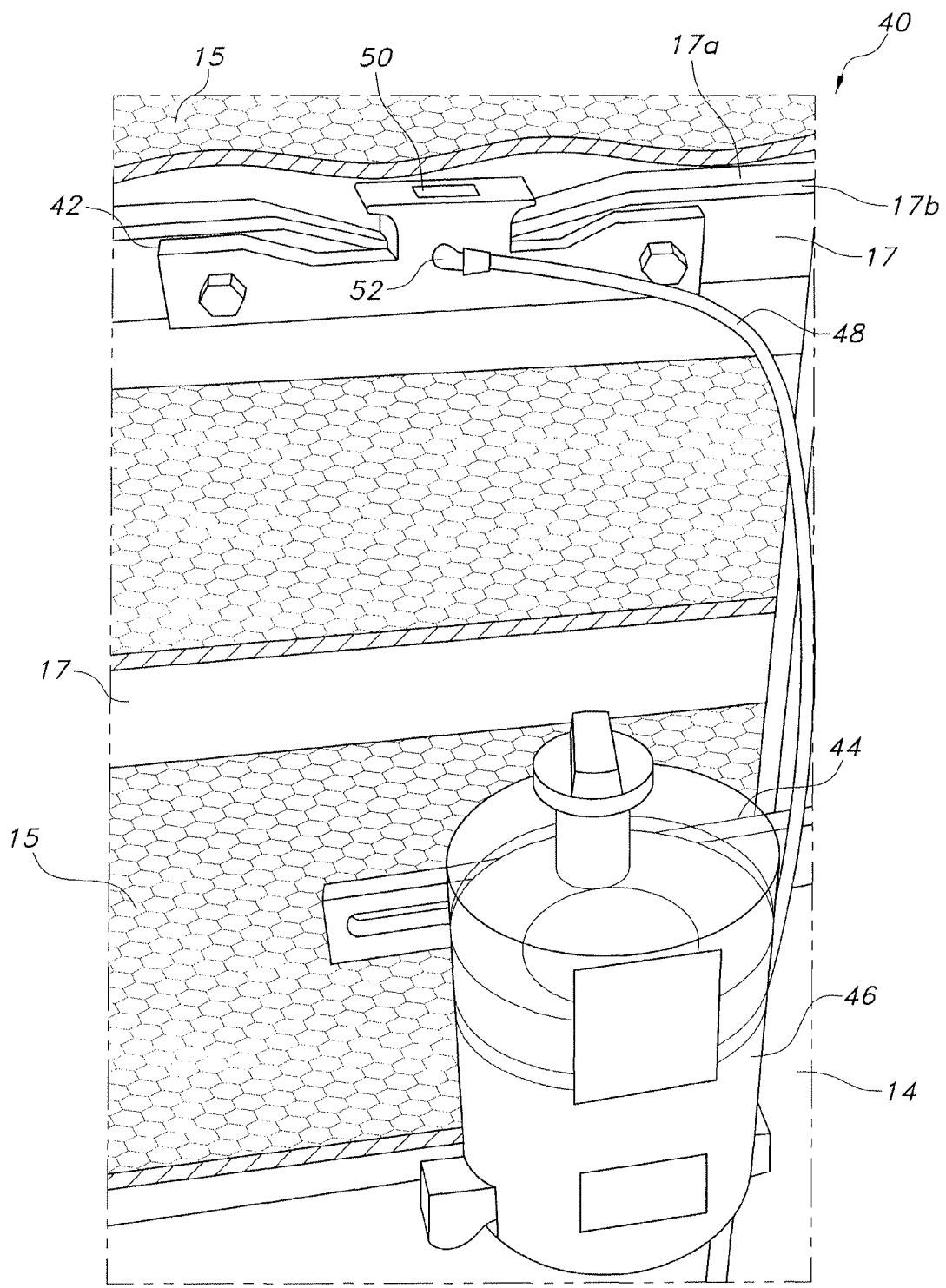
FIG. 5 is a perspective view of the conveyor track lubricator device formed in accordance with the present invention.

Turning now to FIG. 5, a conveyor track lubricator device 40, formed in accordance with the present invention, is shown. The lubricator device 40 of the present invention generally includes an applicator bracket assembly 42, an oil reservoir 44, a pump 46 and tubing 48. As will be discussed in further detail below, the applicator bracket assembly 42 is attached to one of the tracks 17 of the conveyor belt system and supports an applicator pad 50 for applying the lubrication oil to the bottom surface of the conveyor belt 15. The oil reservoir 44 is connected to the pump 46, wherein the pump 46 pumps oil from the reservoir 44 to the bracket assembly 42 via tubing 48. The tubing 48 may be connected to the bracket assembly 42 with a conventional fluid fitting 52, such as a barb fitting or a quick-disconnect fitting, which is threaded into the bracket assembly 42.

Figure 6:
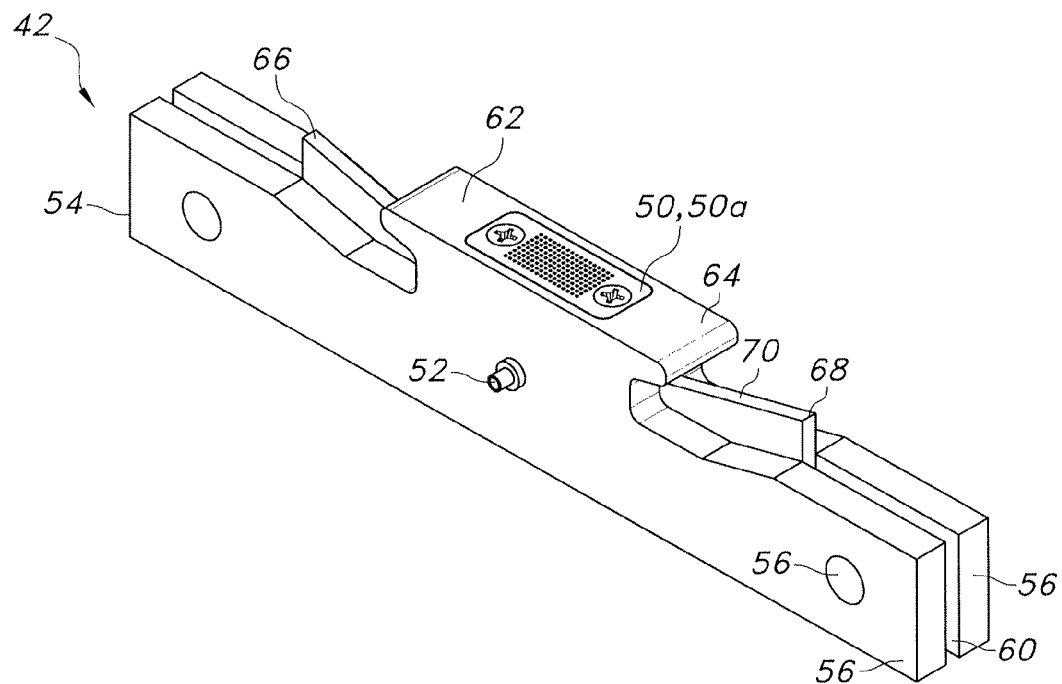
FIG. 6 is an isolated perspective view of the lubricator device bracket assembly shown in FIG. 5.

Referring additionally to FIG. 6, the applicator bracket assembly 42 includes a specially designed bracket 54 adapted for attachment to one of the tracks 17 of a conveyor belt system. The bracket 54 is designed for installation in new conveyor belt systems during initial fabrication and is also designed for retro-fit installation on existing conveyor belt systems.

The bracket 54 includes at least one mounting arm portion 56 having a through-hole 58 for receiving a fastener for mounting the bracket assembly to the track. In a preferred embodiment, the bracket 54 is formed with four mounting arm portions 56, provided in pairs at opposite longitudinal ends of the bracket. Each pair of mounting arm portions 56 defines a gap 60 having a width sized for receiving a track.

The bracket 54 further includes an applicator head portion 62 for supporting the applicator pad 50 in-line with the track 17. In the preferred embodiment shown in FIG. 6, the head portion 62 is formed between the two opposite pairs of mounting arm portions 56 at a central location of the bracket 54. The head portion 62 preferably defines a planar slide surface 64, which, when the bracket assembly 42 is installed on a track 17, is co-planar and in-line with the upper conveyor belt slide surface 17a defined by the wear strips 17b mounted on the track. However, it is possible for the head portion 62 to be disposed below the plane of the track slide surface 17a, so long as the applicator pad 50 is positioned in a co-planar fashion with the track slide surface.

The bracket 54 is further preferably formed with a transition ramp portion 66 provided between the head portion 62 and each opposite pair of mounting arm portions 56. The transition ramp portions 66 are disposed in the gap 60 formed between the mounting arm portions 56. Each transition ramp portion 66 includes a high end 68 facing a longitudinal end of the bracket 54 and a transition surface 70 extending from the high end toward the head portion 62. The transition ramp portion 66 decreases in height, as measured to the transition surface 70, from the high end 68 to the head portion 62. When the bracket assembly 42 is mounted on a conveyor track 17, the transition ramp portions 66 provide a surface for mounting the wear strips 17b provided on the track 17 to the bracket assembly. As can be seen in FIG. 5, the transition ramp portions allow the wear strips 17b mounted on the track 17 to be tucked under the head portion 62 of the bracket assembly 42, wherein the downward sloping transition surfaces 70 of the ramp portions ensure that the conveyor belt 15 is guided toward the applicator pad 50 and will thereby make contact with the pad.

The bracket 54 is preferably made from a low-friction material, such as ultra-high-molecular-weight polyethylene (UHMW). The bracket 54 may be formed by machining or molding, or other process known in the art.

Figure 8:
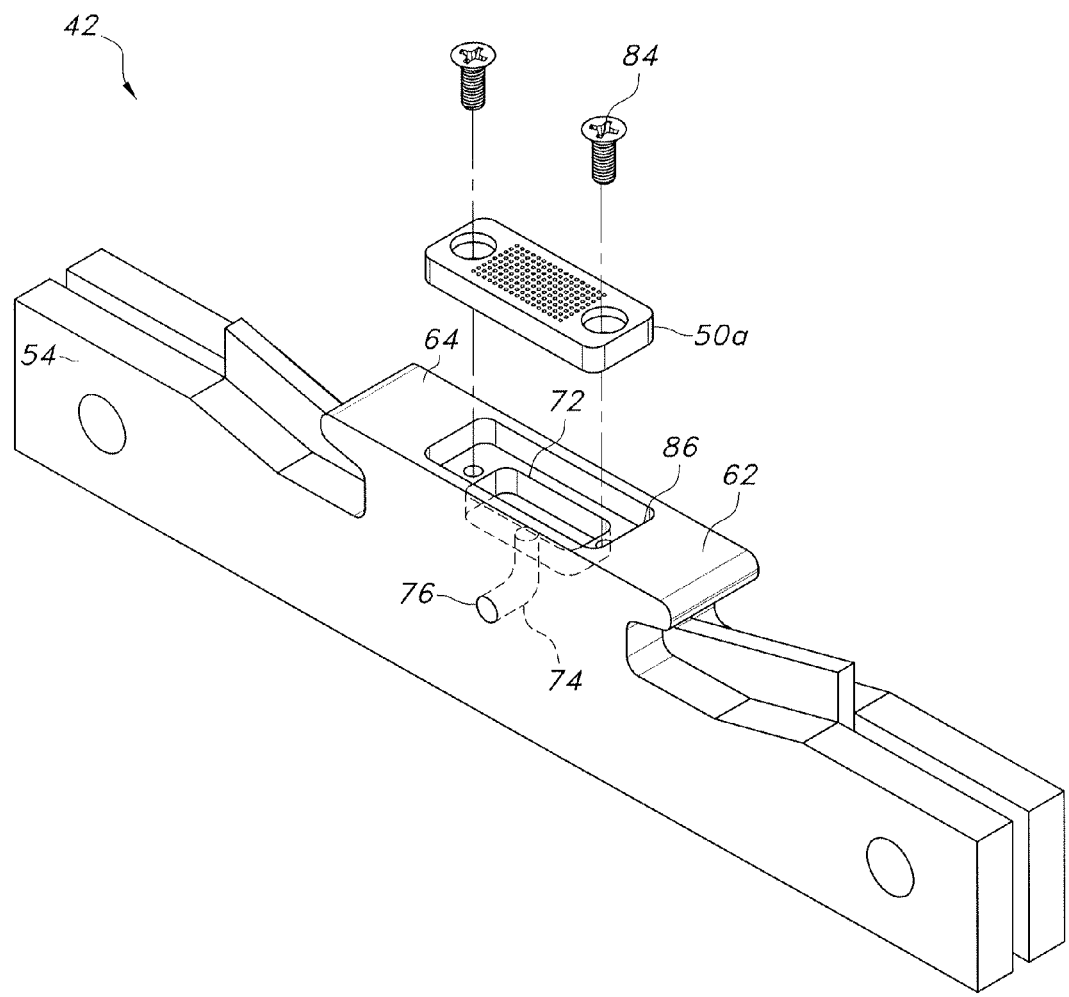
FIG. 8 is an exploded perspective view of the lubricator device bracket assembly shown in FIG. 6.

Referring additionally to FIG. 8, the bracket 54 further includes an internal oil chamber 72 formed within the head portion 62 and an oil conduit 74 connecting the internal oil chamber to an external port 76. The external port 76 may be internally threaded for engaging a threaded fluid fitting 52 in a conventional manner. The internal oil chamber 72 is preferably open at the top of the head portion 62 so as to be in fluid communication with the planar slide surface 64 of the head portion. The external port 76 is preferably provided on a side surface of the bracket so as not to interfere with the slide surface 64.

The applicator pad 50 is disposed at the internal oil chamber 72 for conveying oil provided to the internal chamber via the tubing 48 to the underside of the conveyor belt 15. The applicator pad 50 can take various forms. For example, the pad 50 can be made from a porous sponge or foam material having an internal structure that allows for absorption of oil from within the bracket 54 and for application of the oil at an external surface of the pad 50. In such embodiment, it is desirable for the sponge or foam material to have sufficient rigidity and durability to stand up to the constant sliding motion of the belt.

Figure 7:
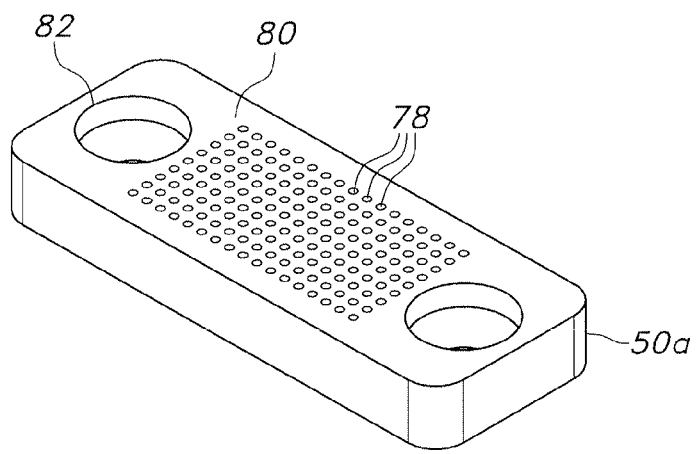
FIG. 7 is an isolated perspective view of the capillary plate shown in FIG. 6.

In a preferred embodiment, the applicator pad takes the form of a capillary plate 50a, as shown in FIG. 7, made from a more rigid and durable material, as compared to a sponge or foam material. The capillary plate 50a has the shape of a thin plate and may be made from a low-friction material such as ultra-high-molecular-weight polyethylene (UHMW). The capillary plate 50a is formed with a plurality of through-holes 78 extending between the top and bottom major surfaces of the plate.

The number and diameter of the through-holes 78 are chosen to provide uniform oil distribution over a desired surface region on the top surface 80 of the plate 50a. The capillary plate 50a is further preferably provided with two counter-sunk fastener through-holes 82 for receiving fasteners 84 for mounting the capillary plate to the head portion 62 of the bracket.

As mentioned above, the bracket 54 supports the applicator pad so that the top surface of the pad is co-planar with the track slide surface 17a. Thus, in the preferred embodiment, the head portion 62 of the bracket 54 is provided with a recess 86 formed in the planar slide surface 64 for receiving the capillary plate 50a. The recess 86 has a depth matching the thickness of the capillary plate 50a so that the top surface 80 of the capillary plate 50a is flush with the planar slide surface 64 of the head portion. In this manner, the top surface 80 of the capillary plate 50a and the slide surface 64 of the head portion are both co-planar with the track slide surface 17a.

The bracket assembly 42, thus assembled, can be installed on any track 17 and at any location along the path of the conveyor belt 15. In a preferred embodiment, bracket assemblies are installed on each track at multiple locations. A single pump 46 and reservoir 44 providing oil to each location may be utilized, or respective pumps and reservoirs can be provided at each location. In either case, the pump is preferably controlled by a program-logic-controller (PLC) for providing a precise amount of oil to each applicator 50.

As a result of the present invention, a conveyor track lubricator device, which can apply lubrication oil at multiple locations, is provided. The device applies lubricant directly on the bottom of the belt in a controlled flow. The lubricating oil amount is controlled and minimized so as to maintain a thin film on the track wear strips. The amount of oil can be easily adjusted by the PLC via a user interface.

As mentioned above, the device can be a part of new conveyor belt installations, or can be retro-fit on existing system. In retro-fit applications, a portion of an existing track is cut-out and the bracket assembly is installed in the gap created by the cut-out. The existing wear strips are then mounted to the transition ramp portions of the bracket assembly so that the top surface of the capillary plate is in-line and coplanar with the top slide surface of the wear strips. This can be done at multiple locations on the existing tracks.

It should be apparent to those skilled in the art that the described embodiments of the present invention provided herein are illustrative only and not limiting, having been presented by way of example only. As described herein, all features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. While various embodiments of the present invention are specifically illustrated and/or described herein, it will be appreciated that modifications and variations of the present invention may be effected by those skilled in the art without departing from the spirit and intended scope of the invention.

All documents, patents and other literature referred to herein are incorporated by reference in their entirety.

The term "comprising" as may be used in the following claims is an open-ended transitional term that is intended to include additional elements not specifically recited in the claims. The term "consisting essentially of" as may be used in the following claims is a partially closed transitional phrase and is intended to include the recited elements plus any unspecified elements that do not materially affect the basic and novel characteristics of the claims. The term "consisting of" as may be used in the following claims is intended to indicate that the claims are restricted to the recited elements.

It should be noted that it is envisioned that any feature, element or limitation that is positively identified in this document may also be specifically excluded as a feature, element or limitation of an embodiment of the present invention.

What is claimed is:

1. A lubricator device for a conveyor belt system comprising:
    an applicator bracket configured for mounting to a conveyor belt supporting track of the conveyor belt system;
    an applicator pad supported on said applicator bracket, said pad being configured for applying a lubricating fluid to a bottom surface of a conveyor belt as the conveyor belt travels along the conveyor belt supporting track; and
    a source of lubricating fluid connected to said applicator pad,
    wherein said applicator pad comprises a capillary plate having a plurality of through-holes extending between a top surface and a bottom surface of said capillary plate, and
    wherein said applicator bracket comprises an internal fluid chamber covered by said bottom surface of said capillary plate, said internal fluid chamber receiving the lubricating fluid from said source of lubricating fluid.

2. A lubricator device as defined in claim 1, further comprising a pump for pumping the lubricating fluid from said source of lubricating fluid to said applicator pad.

3. A lubricator device as defined in claim 1, wherein said applicator bracket comprises a head portion configured for positioning a top surface of said applicator pad in-line and co-planar with a top surface of the conveyor belt supporting track.

4. A lubricator device for a conveyor belt system comprising:
    an applicator bracket configured for mounting to a conveyor belt supporting track of the conveyor belt system;
    an applicator pad supported on said applicator bracket, said pad being configured for applying a lubricating fluid to a bottom surface of a conveyor belt as the conveyor belt travels along the conveyor belt supporting track; and
    a source of lubricating fluid connected to said applicator pad,
    wherein said applicator bracket comprises:
        a head portion configured for positioning a top surface of said applicator pad in-line and co-planar with a top surface of the conveyor belt supporting track; and
        at least one transition ramp portion having an inclined surface rising in a direction away from said head portion, said transition ramp portion being configured for mounting a wear strip of the conveyor belt supporting track thereto.

5. A lubricator device as defined in claim 4,
    wherein said applicator pad comprises a capillary plate having a plurality of through-holes extending between a top surface and a bottom surface of said capillary plate, and
    wherein said applicator bracket comprises an internal fluid chamber covered by said bottom surface of said capillary plate, said internal fluid chamber receiving the lubricating fluid from said source of lubricating fluid.

6. A conveyor belt system comprising:
    a supporting structure;
    at least one track supported on said supporting structure, said at least one track defining a conveyor belt path;
    an endless conveyor belt movably supported on said at least one track;
    a drive mechanism for moving said conveyor belt along said path defined by said at least one track; and
    a lubricating device mounted on said track for applying a lubricating fluid to a bottom surface of said conveyor belt against the direction of gravity as said conveyor belt travels along said at least one track, wherein said lubricating device comprises:
        an applicator bracket attached to said at least one track;
        an applicator pad supported on said applicator bracket, said pad applying the lubricating fluid to the bottom surface of said conveyor belt; and
        a source of lubricating fluid in connected to said applicator pad,
        wherein said applicator pad comprises a capillary plate having a plurality of through-holes extending between a top surface and a bottom surface of said capillary plate, and wherein said applicator bracket comprises an internal fluid chamber communicating with said bottom surface of said capillary plate, said internal fluid chamber receiving the lubricating fluid from said source of lubricating fluid.

7. A conveyor belt system comprising:
    a supporting structure;
    at least one track supported on said supporting structure, said at least one track defining a conveyor belt path;

an endless conveyor belt movably supported on said at least one track;
a drive mechanism for moving said conveyor belt along said path defined by said at least one track; and
a lubricating device mounted on said track for applying a lubricating fluid to a bottom surface of said conveyor belt against the direction of gravity as said conveyor belt travels along said at least one track, wherein said lubricating device comprises:
an applicator bracket attached to said at least one track;
an applicator pad supported on said applicator bracket, said pad applying the lubricating fluid to the bottom surface of said conveyor belt; and
a source of lubricating fluid connected to said applicator pad,
wherein said applicator bracket comprises:
a head portion configured for positioning a top surface of said applicator pad in-line and co-planar with a top surface of said conveyor belt supporting track; and
at least one transition ramp portion having an inclined surface rising in a direction away from said head portion, and wherein the conveyor belt system further comprises wear strip mounted to a top surface of said track and to said inclined surface of said transition ramp portion.

8. A conveyor belt system as defined in claim 7, wherein said lubricating device comprises:
an applicator bracket attached to said at least one track;
an applicator pad supported on said applicator bracket, said pad applying the lubricating fluid to the bottom surface of said conveyor belt; and
a source of lubricating fluid connected to said applicator pad.

9. A conveyor belt system as defined in claim 8, wherein said applicator pad comprises a capillary plate having a plurality of through-holes extending between a top surface and a bottom surface of said capillary plate, and wherein said applicator bracket comprises an internal fluid chamber covered by said bottom surface of said capillary plate, said internal fluid chamber receiving the lubricating fluid from said source of lubricating fluid.

10. A conveyor belt system as defined in claim 8, further comprising a pump for pumping the lubricating fluid from said source of lubricating fluid to said applicator pad.

11. A conveyor belt system as defined in claim 8, wherein said applicator bracket comprises a head portion configured for positioning a top surface of said applicator pad in-line and co-planar with a top surface of said conveyor belt supporting track.

12. A method for lubricating an interface between a moving conveyor belt and a track supporting said moving conveyor belt of a conveyor belt system, the method comprising:
providing a lubricating device on the track;
applying a lubricating fluid to a bottom surface of the conveyor belt with said lubricating device as the conveyor belt travels along the track,
wherein said applicator device comprises:
an applicator bracket attached to the track;
an applicator pad supported on said applicator bracket, said pad applying the lubricating fluid to the bottom surface of the conveyor belt; and
a source of lubricating fluid connected to said applicator pad, and
wherein said applicator pad comprises a capillary plate having a plurality of through-holes extending between a top surface and a bottom surface of said capillary plate, and wherein said applicator bracket comprises an internal fluid chamber covered by said bottom surface of said capillary plate, said internal chamber receiving the lubricating fluid from said source of lubricating fluid.

13. A method as defined in claim 12, wherein said lubricating fluid is applied to the bottom surface of the conveyor belt in a direction against the direction of gravity.

14. A method as defined in claim 12, wherein said lubricating fluid is applied at a location in-line and co-planar with a top surface of the track.

15. A method of installing a lubricating device on a conveyor belt system having a track defining a conveyor belt path and an endless conveyor belt movably supported on the track, the method comprising mounting a lubricating device on the track for applying a lubricating fluid to a bottom surface of the conveyor belt against the direction of gravity as the conveyor belt travels along the track, wherein said mounting of said lubricating device comprises:
removing a portion of the track to form a gap in the track; and
installing an applicator pad of said lubricating device in said gap of the track, whereby said applicator pad is in-line and co-planar with a top surface of the track,
wherein said applicator pad comprises a capillary plate having a plurality of through-holes extending between a top surface and a bottom surface of said capillary plate, said top surface being in-line and co-planar with the top surface of the track.

16. A method as defined in claim 15, further comprising connecting a source of lubricating fluid and a pump to said lubricating device, said pump pumping the lubricating fluid from said source to said lubricating device.

* * * * *